United States Patent [19]

Barnard et al.

[11] Patent Number: 4,660,759
[45] Date of Patent: Apr. 28, 1987

[54] OPTIMUM START/STOP DEPENDENT UPON BOTH SPACE TEMPERATURE AND OUTDOOR AIR TEMPERATURE

[75] Inventors: William B. Barnard, Arlington Heights; Gideon Shavit, Highland Park; Richard A. Wruck, Mount Prospect, all of Ill.

[73] Assignee: Honeywell Inc., Minneapolis, Minn.

[21] Appl. No.: 670,513

[22] Filed: Nov. 13, 1984

[51] Int. Cl.⁴ ............................................... F23N 5/20
[52] U.S. Cl. ..................................... 236/46 R; 165/12
[58] Field of Search ............. 165/12; 236/46 R, 91 D, 236/91 R; 364/557, 505

[56] References Cited

U.S. PATENT DOCUMENTS

| | | | |
|---|---|---|---|
| 4,172,555 | 10/1979 | Levine | 236/46 R |
| 4,386,649 | 6/1983 | Hines et al. | 236/46 R X |
| 4,436,064 | 3/1984 | Lamkewitz et al. | 236/46 R X |
| 4,475,685 | 10/1984 | Grimado et al. | 236/46 R |

Primary Examiner—William E. Wayner
Attorney, Agent, or Firm—Trevor B. Joike; John P. Sumner

[57] ABSTRACT

A system for determining the optimum stop time of an air conditioning system within a building so that energy can be conserved by shutting down the temperature control system an amount of lead time prior to end of occupancy of said building wherein said amount of lead time is arranged to confine space temperature within a comfort range as said space temperature drifts during said amount of lead time, said system including a space temperature sensor for sensing space temperature within the building, an outdoor air temperature sensor for sensing outdoor air temperature external to the building, and a controller connected to the space temperature sensor, the outdoor air temperature sensor and the temperature control system for determining temperature drift rate within the building and for turning off the temperature control system before the end of occupancy of the building by an amount of lead time dependent upon the temperature drift and the outdoor air temperature.

22 Claims, 5 Drawing Figures

OPTIMUM START/STOP DEPENDENT UPON BOTH SPACE TEMPERATURE AND OUTDOOR AIR TEMPERATURE

BACKGROUND OF THE INVENTION

The present invention relates to an optimum stop control system for turning off a building's temperature control system an amount of lead time prior to the end of occupancy of the building in order to conserve energy or starting such temperature control system an optimum amount of lead time prior to the beginning of occupancy and, more particularly, to such a system wherein the amount of lead time is based both upon the drift in temperature within the building during a period of time when the temperature control system is off or on depending on whether the next operation to be performed is a stop or start operation and upon outdoor air temperature.

Most control systems which control the temperature control systems of commercial buildings today have various energy management functions which the control systems can perform. For example, the setpoint temperature within the building can be set up during summer months and set back during winter months when the building is not occupied in order to reduce the cost of running the temperature control systems during times of non-occupancy. Together with the set up and set back function, the systems can perform an optimum start function in which the air conditioning system is reenergized for an amount of time calculated to bring the space temperature within the comfort range for the building by the start of occupancy. In addition, typical systems will also provide an optimum stop function in which the air conditioning system is shut off for a period of time prior to end of occupancy, this period of time designed to allow the space temperature to drift within the comfort range but not drift beyond the comfort range before the end of occupancy.

Prior optimum start and optimum stop systems of this nature have relied upon outdoor air temperature to determine the amount of lead time necessary in performing the optimum start/stop functions. For example, during the heating months, the colder the outdoor air temperature, the more lead time is necessary during an optimum start function and the less lead time is allowed during the optimum stop function to make sure that during the entire period of occupancy, the space temperature is within the desired comfort range. The comfort range is defined here as the range established between the minimum allowable comfortable space temperature and the maximum allowable comfortable space temperature. The use of outdoor air temperature by itself to determine the lead time for use in optimum start/stop functions is not ideal because each building, because of its construction and because of external factors other than outdoor temperature, such as wind and solar radiation, do not have the same heat loss for the same outdoor air temperature.

Thus, optimum start/stop functions have been developed to use space temperature drift rate in order to determine the lead time. The space temperature drift rate is determined in such systems by controlling the temperature control system at its off state for the optimum stop function and at its on state for the optimum start function and for then dividing the temperature swing while the air conditioning system is in this state by the amount of time that the temperature control system is in that state. For example, for an optimum start function and during winter months, the temperature control system is turned on at some time during the set back period and the temperature increase is then divided by the amount of time spanning that temperature increase in order to calculate drift rate which then can be used to determine the optimum start time. On the other hand, during winter months, the temperature control system can be turned off and the amount of temperature drift during that off time is divided by the amount of off time in order to determine the drift rate usable in optimum stop functions.

This approach, however, requires the temperature control system to be artificially turned on or off in order to determine drift rate usable in the optimum start/stop functions. Moreover, prior systems have tended to be inaccurate because they rely either upon only space temperature or only upon outdoor air temperature. The present invention overcomes many of these prior art failings by providing a system which utilizes temperature drift and dead time in order to determine the optimum lead time as modified by the outdoor air temperature.

SUMMARY OF THE INVENTION

Accordingly, the present invention relates to a system for determining the optimum start/stop time of a temperature control system within a building so that energy can be conserved by starting the air conditioning an optimum amount of lead time prior to the start of building occupancy or by shutting down the temperature control system an amount of lead time prior to the end of occupancy of the building, wherein the amount of lead time is arranged to confine space temperature within a comfort range as the space temperature drifts during the amount of lead time, the system including a space temperature sensor for sensing space temperature within the building, an outdoor air temperature sensor for sensing outdoor air temperature external to the building, and a controller connected to the space temperature sensor, the outdoor air temperature sensor and the temperature control system for determining temperature drift rate within the building and for turning off the temperature control system before the end of occupancy of the building by an amount of lead time dependent upon the temperature drift rate, dead time, and the outdoor air temperature.

BRIEF DESCRIPTION OF THE DRAWINGS

These and other features and advantages will become more apparent from a detailed consideration of the invention when taken in conjunction with the drawings in which.

DETAILED DESCRIPTION

Figure 1:
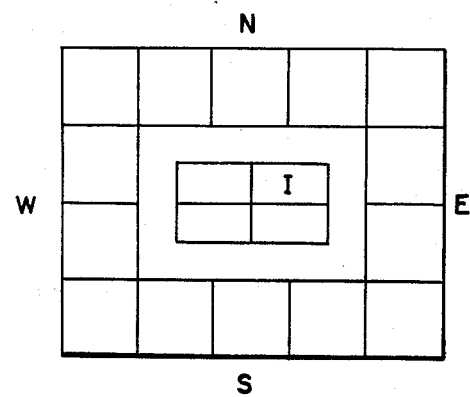
FIG. 1 shows a floor plan of a typical commercial building having exterior zones such as north facing zones N, east facing zones E, south facing zones S and west facing zones W, and interior zones I.

The present invention can be used in systems of any sizes for controlling the heating and/or cooling plants (temperature control systems) of any sized buildings. Those skilled in the art will perceive that the presnt invention could be used to determine either optimum start or stop times. Only the computation of stop times will be discussed herein. For purposes of illustration, FIG. 1 shows the floor plan of one floor of a typical building in which the present system can be used. This floor plan shows a plurality of exterior zones, i.e. zones which have at least one wall forming the outside perimeter of the building, of which zones E face to the east, zones N face to the north, zones W face to the west, and zones S face to the south. Also, there are a plurality of interior zones I which do not have any walls forming the outside perimeter of the building.

Figure 2:
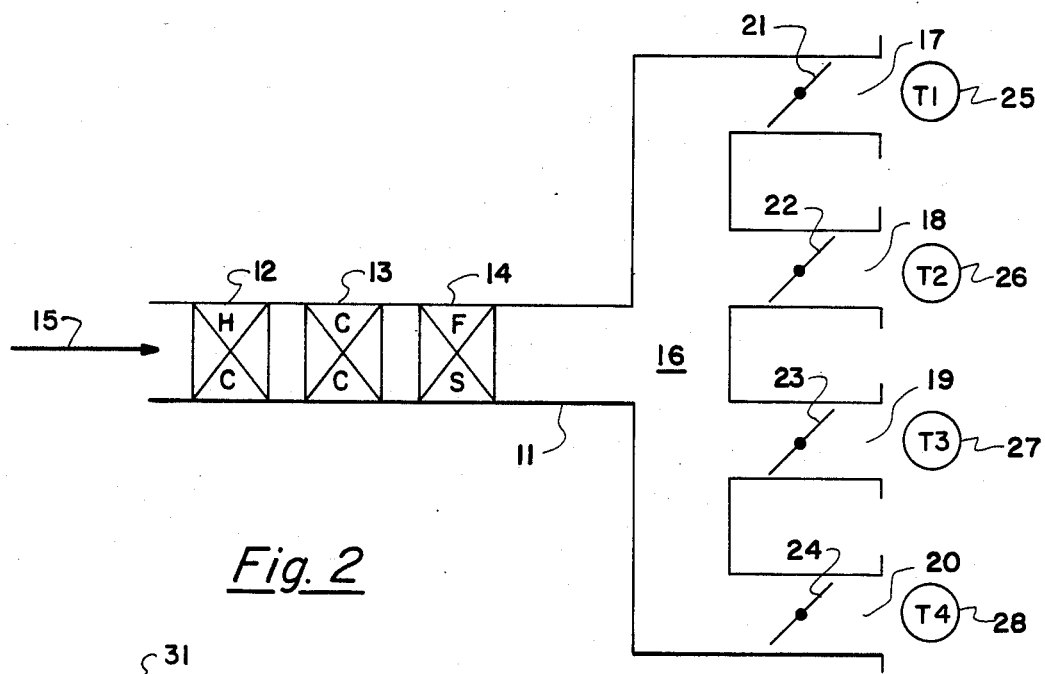
FIG. 2 shows a fan system which can supply temperature control air to each of the zones shown in FIG. 1.

FIG. 2 shows a fan system for supplying one or more of the zones N, E, S, W or I as shown in FIG. 1. For purposes of the present discussion, the fan system shown in FIG. 2 can comprise the temperature control system which is being controlled by the present control system. As shown in FIG. 2, the fan system includes supply air duct 11 having therein heating coil 12, cooling coil 13 and fan supply 14. The heating coil 12 is supplied with hot water from a boiler in order to heat the air flowing through supply duct 11 and being delivered to the zone. Cooling coil 13 is supplied with chilled water from a chiller under control of various water pumps, valves and temperature controllers in order to cool the air moving through supply duct 11. Fan supply 14 is a fan which drives the air from inlet 15 to discharge air duct 16 so that the air can be supplied to the zone or zones supplied by the fan system shown in FIG. 2.

Although the fan system or temperature control system shown in FIG. 2 is comprised of a heating coil, a cooling coil and a fan, additional or alternative equipment can be included within temperature control system. For example, the temperature control system may include pumps, vales, chillers, furnaces, supply fans, return fans and/or secondary chilled water pumps.

As shown in FIG. 2, the air is discharge air duct 16 is supplied to various diffusers 17, 18, 19 and 20 as controlled by corresponding dampers 21, 22, 23 and 24. One or more space temperature sensors can be included in the zone or zones supplied by discharge air duct 16 and may include space temperature sensors 25, 26, 27 and 28.

Figure 3:
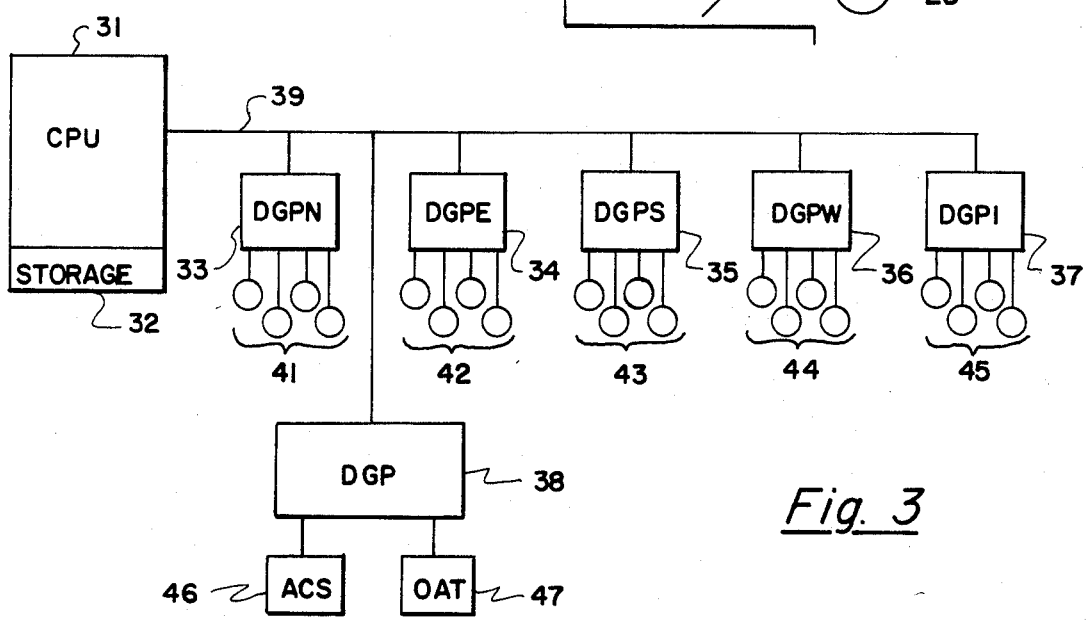
FIG. 3 shows the controller which can be used to control the air conditioning fan system of FIG. 2; and, FIGS. 4A–4B show in flow chart form the way in which the control system of FIG. 3 controls the temperature control fan system.

The control system for controlling the air conditioning system shown in FIG. 2 is shown in FIG. 3. This control system includes a central processing unit 31 having a storage unit 32 associated therewith. CPU 31 communicates with remote data gathering panels (DGPs) 33, 34, 35, 36, 37 and 38 over a common communication channel 39. Remote data gathering panel (DGP) 33 is shown having a plurality of space temperature inputs 41 monitoring the zone or zones on the north side of the building, data gathering panel 34 is connected to a plurality of input space temperature sensors 42 for monitoring the space temperatures of the zone or zones on the east side of the building, DGP 35 is connected to a plurality of input temperatre sensors 43 for sensing the temperature of the zone or zones on the south side of the floor shown in FIG. 1, data gathering panel 36 is connected to a plurality of input space temperature sensors 44 for sensing the space temperature at various points on the west side of the building and data gathering panel 37 is connected to a plurality of input space temperature sensors 45 for sensing the space temperature at various points in the interior zone or zones as shown in FIG. 1. Additionally, data gathering panel 38 is connected to have an output for turning the temperature control system 46, as represented by FIG. 2, on and off and has as an input an outdoor air temperature sensor 47. The control system shown in FIG. 3 may be any of the Delta automated building control systems manufactured by Honeywell Inc.

Figure 4A:
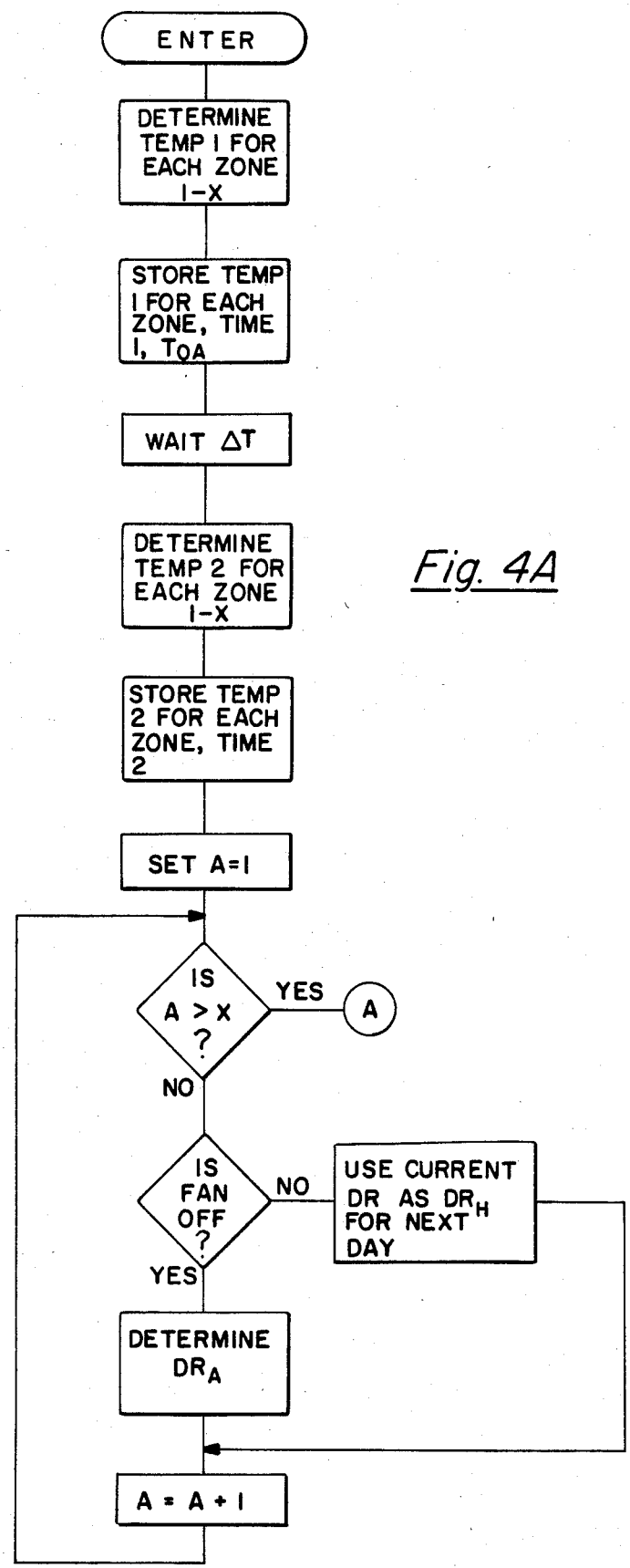
Figure 4B:
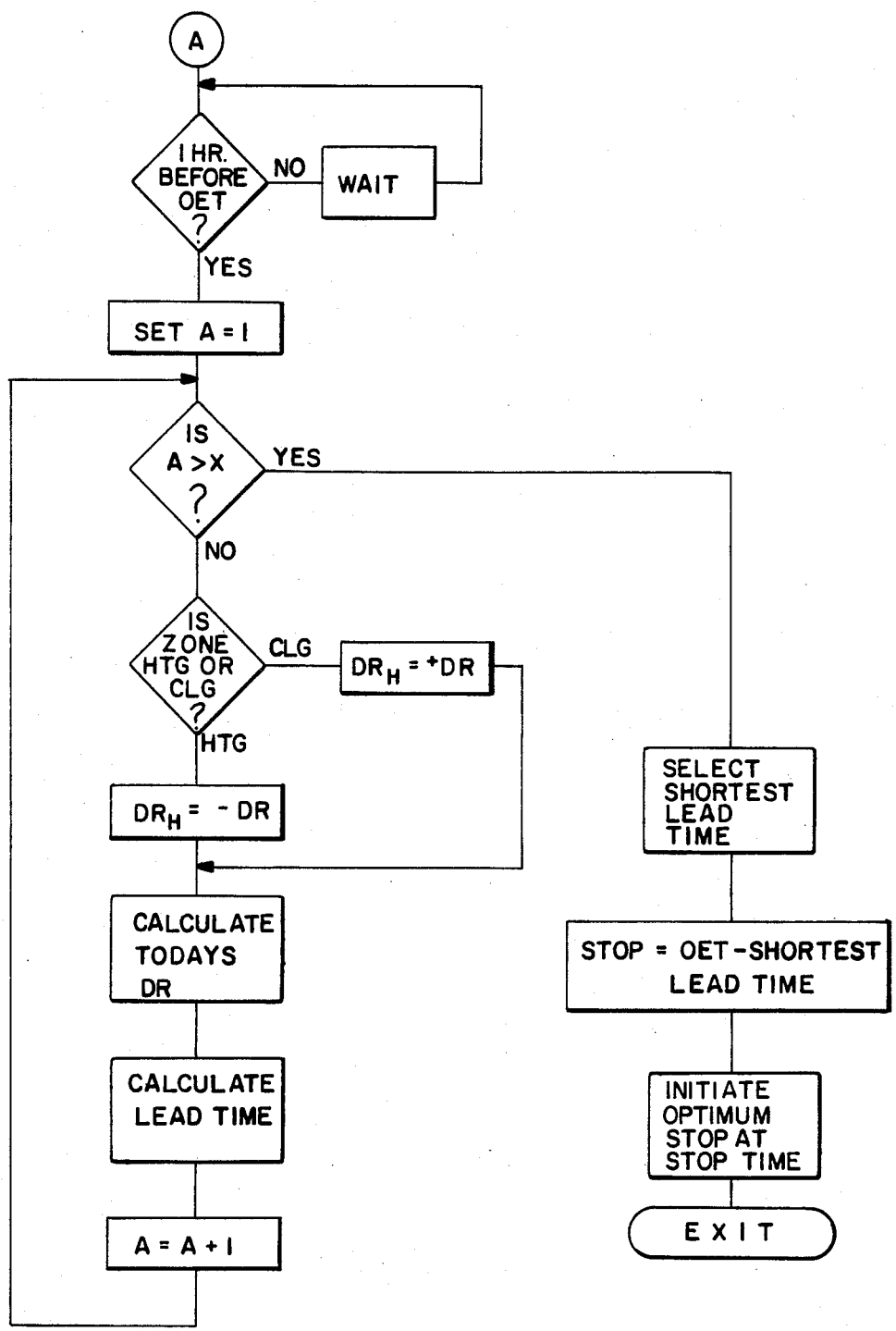

Upon initial start up of the system shown in FIG. 3, the central processing unit 31 will for the first day assume a predetermined drift rate which will result in essentially a 0 lead time for that day. Thus, the temperature control system is not deenergized until end of occupancy. For purposes of optimum stop calculations, drift rate is defined as the rate of temperature change of an occupied space in a building during the time when the heating/cooling equipment (e.g., fan system) is turned off. Drift rate is calculated in units of degrees per minute. Because the drift rate must be determined during the off time of the temperature control equipment, the system of FIG. 3 as shown in FIG. 4A will enter the routine at the time that the optimum stop command is issued. At this point, the temperature control system will be turned off.

Central processing unit 31 of FIG. 3 will then determine the space temperature for each of the zones 1 through X where X is the maximum number of zones controlled by the system shown in FIG. 3. In the case where a zone has plural space temperature sensors associated therewith, central processing unit 31 will average the outputs from the plural space temperature sensors to derive the average space temperature for that zone. These space temperatures TEMP1 for each zone, the time TIME1 at which these measurements are taken and the outdoor air temperature are all stored in memory 32. The outdoor air temperature and the space temperature become the historic outdoor air temperature and space temperature which are then used in calculating the lead time on the next subsequent day on which an optimum stop procedure is to be performed.

After the temperature control system is stopped dead time is determined for each temperature zone. Dead time is defined as the response time of the zone space temperature to the temperature control system shutdown. For example, the dead time for a temperature zone operating in the heating mode is the amount of time between boiler shutdown and the zone temperature response in a negative direction. Typically during the dead time in such a system the zone space temperature will increase, peak, and assume a final negative slope. The dead time ends when this negative slope is assumed.

A predetermined amount of time is then waited. For example, the system may be arranged to wait 60 minutes before the space temperatures are next sensed. After that predetermined amount of time, the space temperatures are sensed for each zone with average space temperatures being used for the zones having plural space temperature sensors. These second space temperatures TEMP2 are stored in memory 32 and the time TIME2 at which these second space temperature determinations are made is also stored in storage 32.

As mentioned, drift rate is the change in space temperature over an amount of time T in which the air conditioning system is off in order to determine the magnitude of temperature drift during the off time.

Since the drift rates of the zones may be different for each of the different types of zones, the drift rate must be calculated for each zone. Thus, variable A is set at 1 and a test is made to determine whether A has exceeded X, the number of zones of the system. If A has not exceeded X, the system will then determine if the fan is off. If the fan is not off at this 60 minute interval, the system will assume that a restart has occurred during the optimum stop time. As a result, the drift rate calculation will not be performed and the stored current drift rate value and temperatures will not be substituted for the new readings and the next lead time calculation will use the existing drift rate as the historical drift rate. It should be noted that if the fan is restarted after an optimum stop command but before end of occupancy, it is presumed that a manual command or another energy management program having higher priority than the optimum stop program has superseded the optimum stop command. Thus, if the fan has been restarted during the optimum stop period, the optimum stop program will not attempt to restop the fan system.

If, however, the fan of zone A is off, the system will determine the drift rate for zone A using the following equation:

$$DR = \frac{TEMP2 - TEMP1}{TIME2 - TIME1} \quad (1)$$

where TEMP1 is the average space temperature for zone A at the beginning of the drift rate time, TEMP2 is the average zone temperature for the zone at the end of the drift time, TIME1 is the time at which the drift time begins and TIME2 is the time at which the drift time ends. As can be seen, if the drift rate is positive, the drift is up and if the drift rate is negative, the drift is down. If the drift rate is 0, no load exists.

The drift rate and dead time for zone A at this point is then stored in memory 32 as the historic drift rate for this zone and replaces the drift rate and dead time for zone A which had been stored in memory 32. The value 1 is added to the value of A and the system next tests to determine whether or not the drift rate for all zones has been calculated. If not, the system keeps making calculations until the drift rate for all zones have been calculated, at which time the routine proceeds to point A.

Central processing unit 31 does not proceed beyond point A until one hour before the end of occupancy for the next day during which an optimum stop routine is to be performed. This one hour selection is arbitrary and can be any amount of desired time. Because of fresh air and other requirements for buildings, the amount of optimum stop time cannot be too great. Accordingly, a maximum limit must be imposed on the amount of optimum stop time during which the air conditioning is shut down prior to end of occupancy. By delaying the calculation of lead time until one hour before end of occupancy, the system automatically imposes a one hour maximum limit for the optimum stop time during which the air conditioning system is shut down prior to end of occupancy. Thus, the system periodically tests to determine whether or not actual time is within one hour of the end of occupancy time. If not, the system waits and keeps testing. Once the time is within one hour of the occupancy end time, the value A is again set to 1 and a test is made to determine whether or not A has exceeded X, the number of zones controlled by the system shown in FIG. 3.

The first step once A has been set to 1 and is tested to see whether it exceeds the value X, is to determine whether a positive value or a negative value of the historical drift rate is to be used. To make this determination requires that the current mode (heating or cooling) for each zone be identified. If the zone is an interior zone, the zone must always be in the cooling mode and no further tests are necessary. This is because an interior zone always represents a cooling load to the system. For exterior zones, i.e. the north zones, east zones, south zones and west zones for the floor plan shown in FIG. 1, one way to determine whether or not the system is in the heating or cooling mode is to sample the outdoor air temperature. If the outdoor air temperature is equal to or exceeds 65° F., then all zones are in cooling and no further tests are necessary. If the outdoor air temperature is less than 65° F., then the average space temperature for each zone must be compared to the comfort range midpoint for that zone.

A comfort range is the range in which space temperature is allowed to drift in order to maintain comfortable temperatures within the zone. A comfort range is established as an energy savings procedure in order to maintain temperature control systems off or at minimum energy consumption as long as the space temperature is within the comfort range established for that zone. For example, it may be determined that as long as the space temperature is within the range of 68° as a minimum and 78° as a maximum, the temperature control system will not attempt to adjust the space temperature.

If the average space temperature is equal to or exceeds the midpoint of the comfort range, then the zone is in cooling but if the average space temperature is less than the midpoint of the comfort range then the zone is in heating. If the zone is in cooling, then the positive drift rate is used as the historical drift rate but if the zone is in heating, then the negative drift rate is used as the historical drift rate.

The drift rate for the current day will now be calculated based upon the drift rate which was determined for the previous day and stored as the historical drift rate, i.e. the drift rate that was determined for each zone using the procedure shown in FIG. 4A. The current drift rate, DRt, and dead time, DTt, can then be determined by the equation:

$$DRt = \frac{STt - OATt}{STh - OATh} DRh \quad (2)$$

$$DTt = \frac{STt - OATt}{STh - OATh} DTh \quad (3)$$

where STt is the current day's average zone temperature for the zone under consideration, OATt is the current day's outdoor air temperature, STh is the historical average zone temperature from the previous day, OATh is the historical outdoor air temperature from the previous day, and DTh is the historical dead time from the previous day.

Lead time for zone A is then calculated using the following equation:

$$LT = \frac{TM}{DRt} + DTt \quad (4)$$

where TM is the temperature margin, DRt is the absolute value of the drift rate, and DTt is the dead time for zone A which was just calculated for the current day. The temperature margin is calculated for each zone. This temperature margin is the absolute difference between the average zone temperature and the appropriate comfort limit which, for zones in heating, is the low comfort limit and for zones in cooling is the high comfort limit.

The value of A is incremented by 1 and a test is made to determine whether or not the value of A exceeds X. If not, the lead time for each of the other zones is determined. Once the lead times for all zones has been determined, the shortest lead time is then selected because the shortest lead time represents the zone requiring the most temperature control treatment. The optimum stop time is then determined by subtracting from the occupancy end time the shortest lead time. Once the stop time is reached, the optimum stop command is initiated. The system will store the current drift rate and dead time as the historical drift rate for the next day's calculations. Then, it will store the average space temperatures as the historic space temperatures and the outdoor air temperature as the historic outdoor air temperature for the next day's determinations.

If the drift rate is 0, lead time becomes maximum and need not be calculated.

The embodiments of the invention in which an exclusive property or right is claimed are defined as follows:

1. A system for determining the optimum stop time of an temperature control system within a building so that energy can be conserved by shutting down the temperature control system an amount of lead time prior to end of occupancy of said building wherein said amount of lead time is arranged to confine space temperature within a comfort range as said space temperature drifts during said amount of lead time, said system comprising:
    space temperature sensing means for sensing space temperature within said building;
    outdoor air temperature sensing means for sensing outdoor air temperature external to the building; and,
    controller means connected to said space temperature sensing means, said outdoor air temperature sensing means, and said temperature control system for determining temperature drift rate within said building and for turning off said temperature control system before the end of occupancy of the building by said amount of lead time dependent upon said space temperature drift rate and said outdoor air temperature.

2. The system of claim 1 wherein said controller means comprises drift rate determining means for determining drift rate as a function of a first space temperature and a second space temperature separated by a time differential, said time differential occurring while said temperature control system is off.

3. The system of claim 2 wherein said drift rate determining means comprises means for determining the amount of lead time based upon dividing a comfort margin temperature by the drift rate and adding dead time.

4. A system for determining the optimum stop time of an temperature control system within a building so that energy can be conserved by shutting down the temperature control system an amount of lead time prior to end of occupancy of said building wherein said amount of lead time is arranged to confine space temperature within a comfort range as said space temperature drifts during said amount of lead time, said system comprising:
    space temperature sensing means for sensing space temperature within said building;
    outdoor air sensing means for sensing outdoor air temperature external to the building;
    storage means for storing a present outdoor air temperature for a present day, a historic outdoor air temperature of a day prior to the present day, and said space temperature; and,
    controller means connected to said space temperature sensing means, to said outdoor air temperature sensing means, to said temperature control system, and to said storage means for determining temperature drift rate within said building and for turning off said temperature control system before the end of occupancy of the building by said amount of lead time dependent upon said space temperature drift rate, said present outdoor air and space temperatures and said historic outdoor air temperature.

5. The system of claim 4 wherein said controller means comprises drift rate determining means for determining drift rate as a function of a first space temperature and a second space temperature separated by a time differential, said time differential occurring while said temperature control system is off.

6. The system of claim 5 wherein said drift rate determining means comprises means for determining the amount of lead time based upon dividing a comfort margin temperature by the drift rate and adding dead time.

7. The system of claim 4 wherein said space temperature sensing means comprises a space temperature sensor for each zone of a multizoned building for sensing the space temperature within its associated zone, said storage means comprises storing means for storing a space temperature sensed by each space temperature sensor.

8. The system of claim 7 wherein said controller means comprises lead time determining means for determining an amount of lead time for each zone based upon a temperature drift rate and dead time associated with each zone, the present outdoor air temperature and the historic outdoor air temperature.

9. The system of claim 8 wherein said controller means comprises stop means for determining the time at which the optimum stop time is to begin by subtracting from the end of occupancy a lead time associated with the zone having the shortest lead time.

10. A system for determining the optimum stop time of a temperature control system within a building so that energy can be conserved by shutting down the temperature control system an amount of lead time prior to end of occupancy of said building wherein said amount of lead time is arranged to confine space temperature within a comfort range as said space temperature drifts during said amount of lead time, said system comprising:
    space temperature sensing means for sensing space temperature within said building;
    outdoor air temperature sensing means for sensing outdoor air temperature external to the building;
    storage means for storing present space and outdoor air temperatures and historic space and outdoor air temperatures, said historic space and outdoor air temperatures based upon space and outdoor air temperatures of a day prior to the day represented by said present space and outdoor air temperatures; and, controller means connected to said space temperature sensing means, said outdoor air temperature sensing means, said temperature control system, and said storage means for determining an historic temperature drift rate within said building for a day prior to a present day and for turning off said temperature control system before the end of occupancy of the building on said present day by said amount of lead time dependent upon said historic drift rate, the present outdoor air and space temperatures and the historic space and outdoor air temperatures.

11. The system of claim 10 wherein said controller means comprises historic drift rate determining means for determining the historic drift rate by dividing the amount of temperature drift of said space temperature by a period of time during which said temperature control system is off, said period of time occurring on said day prior to said present day.

12. The system of claim 11 wherein said storage means includes means for storing a historic space temperature for said day prior to said present day and said controller means comprises current drift rate and dead time determining means for determining current drift rate by multiplying historic values by the quantity which results from dividing the difference between the presnt space temperature for the present day and a present outdoor air temperature for the present day by the difference between the historic space temperature and the historic outdoor air temperature.

13. The system of claim 12 wherein said controller means comprises lead time determining means which determines the amount of lead time by dividing a comfort margin temperature by the current drift rate.

14. The system of claim 13 wherein said storage means comprises means for storing the current drift rate and dead time as the historic drift rate for a day subsequent to the present day.

15. The system of claim 10 wherein said space temperature sensing means comprises a space temperature sensor for each zone of a multizoned building for sensing the zone space temperature within its associated zone, said storage means comprises storing means for storing a zone space temperature sensed by each space temperature sensor.

16. The system of claim 15 wherein said controller means comprises historic drift rate determining means for determining the historic drift rate for each zone by dividing the amount of temperature drift of said zone space temperature by a period of time during which said temperature control system is off, said period of time occurring on said day prior to said present day.

17. The system of claim 16 wherein said controller means comprises current drift rate determining means for determining current drift rate for each zone by multiplying the historic drift rate for each zone by the quantity which results from dividing the difference between present zone space temperature and present outdoor air temperature for the present day by the difference between the historic zone space temperature and the historic outdoor air temperature.

18. The system of claim 17 wherein said controller means comprises lead time determining means which determines the amount of lead time for each zone by dividing a comfort margin temperature by the current zone drift rate and adding dead time.

19. The system of claim 18 wherein the time at which the optimum stop time is to begin is determined by subtracting from the end of occupancy the lead time associated with the zone having the shortest lead time.

20. The system of claim 19 wherein said storage means comprises means for storing the current drift rate and dead time as the historic drift rate and dead time for each zone to be used in determining the amount of lead time for each zone for a day subsequent to the present day and for storing the current outdoor air temperature as the historic outdoor air temperature for determining lead time for each zone for a day subsequent to the present day.

21. A system for determining the optimum start time of an temperature control system within a building so that energy can be conserved by starting the temperature control system an optimum amount of lead time prior to start of occupancy wherein said amount of lead time is arranged to bring said space temperature to within a comfort range by said start of occupancy, said system comprising:

space temperature sensing means for sensing space temperature within said building;

outdoor air temperature sensing means for sensing outdoor air temperature external to the building; and, controller means connected to said space temperature sensing means, said outdoor air temperature sensing means, and said temperature control system for determining temperature drift rate within said building and for starting the temperature control system an amount of lead time prior to the start of building occupancy wherein said amount of lead time is arranged to bring said space temperature to within a comfort range by said start of occupancy.

22. A system for determining the optimum stop time of a temperature control system within a building so that energy can be conserved by shutting down the temperature control system an amount of lead time prior to end of occupancy of said building wherein said amount of lead time is arranged to confine space temperature within a comfort range as said space temperature drifts during said amount of lead time, said system comprising:

space temperature sensing means for sensing space temperature within said building;

outdoor air temperature sensing means for sensing outdoor air temperature external to the building; and, controller means connected to said space temperature sensing means, said outdoor air temperature sensing means, and said temperature control system for determining space temperature drift rate within said building and for turning off said temperature control system before the end of occupancy of the building by said amount of lead time dependent upon said space temperature, said space temperature drift rate and said outdoor air temperature.

* * * * *